United States Patent
Fujiwara

(10) Patent No.: US 6,708,295 B2
(45) Date of Patent: Mar. 16, 2004

(54) CIRCUIT AND METHOD, FOR STORING DATA PRIOR TO AND AFTER DETERMINING FAILURE

(75) Inventor: Noritada Fujiwara, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 562 days.

(21) Appl. No.: 09/818,785

(22) Filed: Mar. 28, 2001

(65) Prior Publication Data

US 2001/0027545 A1 Oct. 4, 2001

(30) Foreign Application Priority Data

Mar. 28, 2000 (JP) ..................................... 2000-089067

(51) Int. Cl.[7] ............................................... G06F 11/34
(52) U.S. Cl. ...................................................... 714/45
(58) Field of Search ........................ 714/45, 723, 735, 714/736

(56) References Cited

U.S. PATENT DOCUMENTS

| | | | | |
|---|---|---|---|---|
| 4,628,511 A | * | 12/1986 | Stitzlein et al. ................ | 714/45 |
| 5,751,942 A | * | 5/1998 | Christensen et al. ........... | 714/38 |
| 5,819,024 A | * | 10/1998 | Kasuga et al. ................. | 714/26 |
| 6,105,146 A | * | 8/2000 | Tavallaei et al. ................ | 714/2 |

FOREIGN PATENT DOCUMENTS

| | | | | |
|---|---|---|---|---|
| JP | 10-311866 | | 11/1988 | |
| JP | 403118724 A | * | 5/1991 | ............. H02J/3/00 |

* cited by examiner

*Primary Examiner*—Scott Baderman
(74) *Attorney, Agent, or Firm*—Oliff & Berridge, PLC

(57) ABSTRACT

A circuit and a method, which can easily store data prior to and after determining a failure of a device without using a shift circuit. The circuit comprises: a counter for enabling a memory to write the data prior to determining the failure, and for disabling the memory from writing any data on the basis of the number of the data prior to and after determining the failure; a first address pointer circuit for controlling the memory so as to store the data prior to determining the failure in a predetermined address space, and for holding an address pointer indicating the predetermined address space; and a second address pointer circuit for controlling the memory so as to store the data after determining the failure of the device in a predetermined address space other than the predetermined address space wherein the data prior to determining the failure is stored.

8 Claims, 4 Drawing Sheets

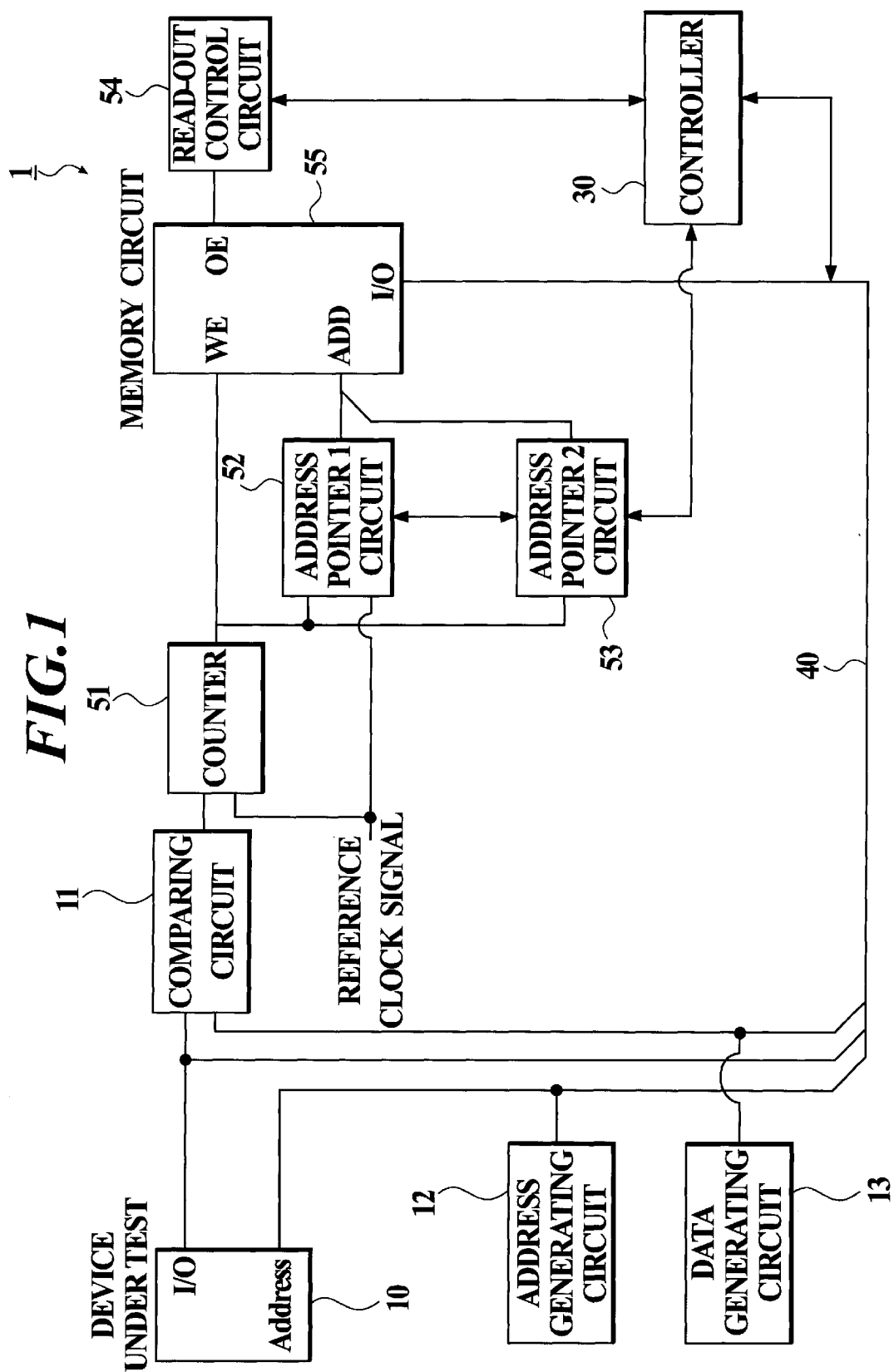

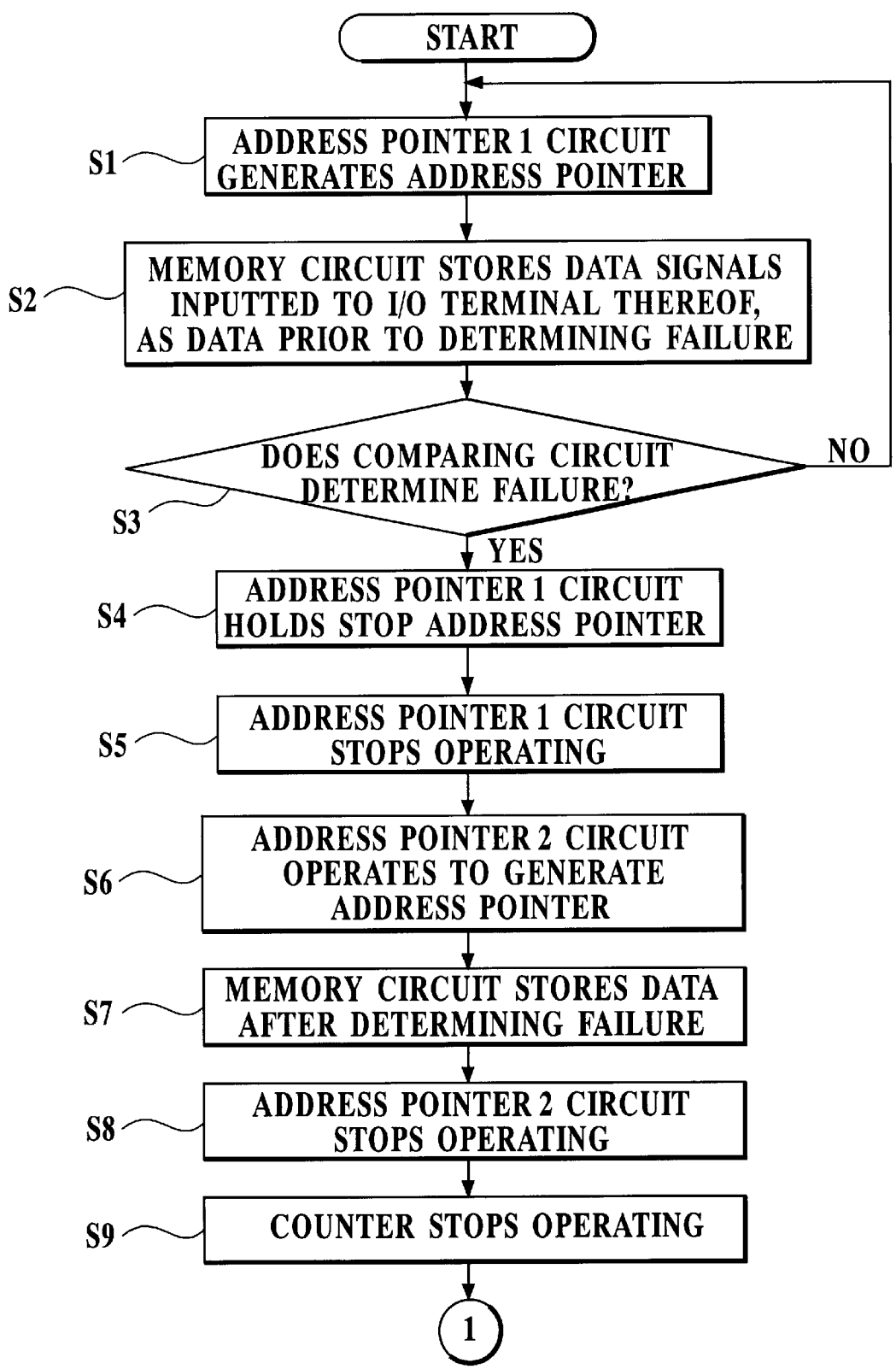

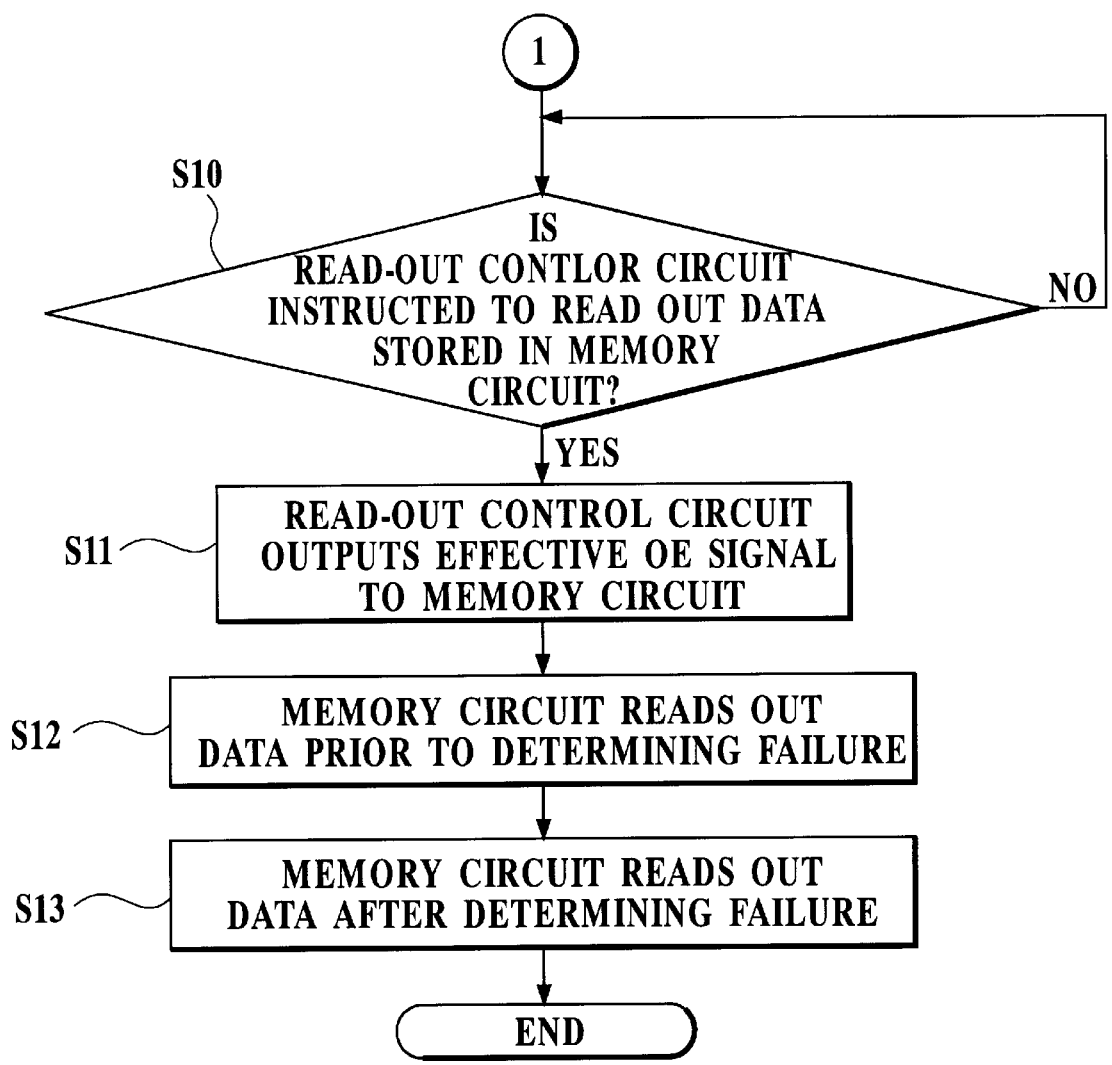

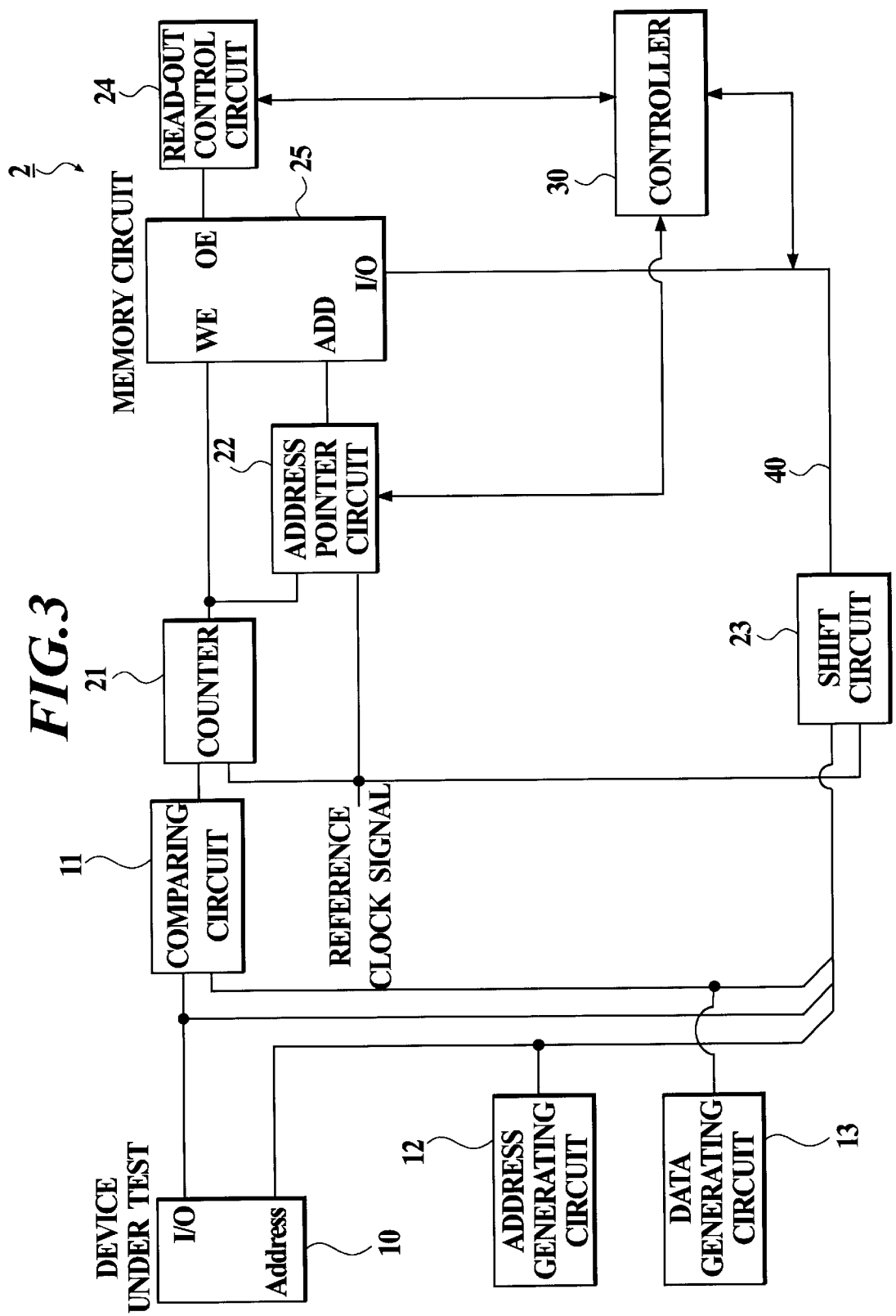

CIRCUIT AND METHOD, FOR STORING DATA PRIOR TO AND AFTER DETERMINING FAILURE

BACKGROUND OF THE INVENTION

1. Field of the Invention

The present invention relates to a failure analysis memory used for analyzing a failure of a device, in particular to a circuit and a method, for storing data prior to and after determining the failure of the device.

2. Description of Related Art

A failure analysis memory used for analyzing a failure of a device is a circuit for storing such data as an address, a data and so on at the real time of determining the failure of the device, when being triggered by the failure signal from the device. For example, the failure analysis memory is a circuit used in a burn-in tester.

The burn-in tester is a semiconductor testing apparatus for electrically testing a device under the temperature-stress. The burn-in tester comprises a thermostatic chamber wherein a temperature thereof and an electric signal thereof can be programmed and a plurality of burn-in boards on which devices under test are mounted can be contained. The burn-in tester and the burn-in boards are connected to each other through a connecter, to transmit and receive various electric signals between them. Therefore, the burn-in tester tests each of burn-in boards according to each burn-in board.

FIG. 3 shows a structure of a circuit 2 for storing data prior to and after determining a failure of a device, according to an earlier development. In FIG. 3, the circuit 2 comprises a device under test 10, a comparing circuit 11, an address generating circuit 12, a data generating circuit 13, a counter 21, an address pointer circuit 22, a shift circuit 23, a read-out control circuit 24, a memory circuit 25 and a controller 30.

The device under test 10 outputs an output signal, and the data generating device 13 outputs an expected value signal. The comparing circuit 11 compares the output signal with the expected value signal, to determine the pass or the failure of the device under test 10. When the comparing circuit 11 determines the failure of the device under test 10, the counter 21 counts up the number of data stored prior to determining the failure of the device and the number of data stored after determining the failure of the device, and outputs an effective WE (Write Enable) signal to a WE terminal of the memory circuit 25 every counting up. Thereafter, the memory circuit 25 stores data signals inputted to a data pin (I/O) to an address space thereof indicated by an address pointer signal inputted to an address (ADD) terminal.

The address pointer signal to be inputted to the ADD terminal of the memory circuit 25 is generated by the address pointer circuit 22. That is, when the address pointer circuit 22 receives the WE signal outputted from the counter 21, the address pointer circuit 22 counts up an address pointer every counting, to generate the address pointer signal. Therefore, the address pointer circuit 55 outputs the address pointer signal generated to the ADD terminal of the memory circuit 22.

The data signal to be inputted to the I/O terminal of the memory circuit 25 comprises, for example, an address signal outputted from the address generating circuit 12, the expected value signal outputted from the data generating circuit 13, and the output signal outputted from the device under test 10. Further, the data signal is inputted to the I/O terminal through a bus 40 and the shift circuit 23 composed of shift registers corresponding to the number of data stored prior to determining the failure of the device under test 10.

Because a reference clock signal is inputted to both the counter 21 and the shift circuit 23, the data signal outputted from the shift circuit 23 is inputted to the I/O terminal of the memory circuit 25 later than the time wherein the WE signal outputted from the counter 21 is inputted to the WE terminal of the memory circuit 25 by the time corresponding to the number of steps of the shift registers contained in the shift circuit 23. Accordingly, it is possible that the memory circuit 25 stores the data prior to determining the failure of the device under test 10, therein.

The data stored in the memory circuit 25 is read out according as the read-out control circuit 24 controls and outputs an OE (Output Enable) signal to an OE terminal of the memory circuit 25. That is, when the effective OE signal outputted from the read-out control circuit 24 is inputted to the OE terminal of the memory circuit 25, the memory circuit 25 outputs the data stored therein from the I/O terminal, and after, the controller 30 stores the data therein. Therefore, an operator analyzes the device under test 10 on the basis of the data stored in the controller 30.

However, because the circuit 2 for storing data prior to and after determining the failure of the device, as show in FIG. 3, according to an earlier development, uses the shift register for holding the data prior to determining the failure of the device, it is necessary that the circuit 2 comprises the shift registers corresponding to the number of data to be stored prior to determining the failure. As a result, in the case wherein there are a lot of data to be stored prior to determining the failure of the device or there are a lot of data stored prior to determining the failure of the device, there has been programs wherein the step number of the shift registers contained in the shift circuit 23 increases extremely and the shift circuit 23 has a more complex structure.

SUMMARY OF THE INVENTION

The present invention was developed in order to solve the problems as mentioned above.

An object of the present invention is to provide a circuit and a method, which can easily store data prior to and after determining a failure of a device without using a shift circuit being under the control of a number of data prior to determining the failure of the device.

In accordance with the first aspect of the present invention, a circuit (for example, a circuit 1 shown in FIG. 1) for storing data prior to and after determining a failure of a device, comprises: a counter (for example, a counter 51 shown in FIG. 1) for always enabling a memory (for example, a memory circuit 55 shown in FIG. 1) which stores data prior to and after determining a failure of a device, to write the data prior to determining the failure of the device, before the device is determined as the failure, and for disabling the memory from writing any data on the basis of the number of the data prior to and after determining the failure, after the device is determined as the failure; a first address pointer circuit (for example, an address pointer 1 circuit 52 shown in FIG. 1) for controlling the memory so as to always store the data prior to determining the failure of the device in a predetermined address space thereof, until the device is determined as the failure, and for holding an address pointer indicating the predetermined address space wherein the data prior to determining the failure of the device is stored, when the device is determined as the failure; and a second address pointer circuit (for example, an address pointer 2 circuit 53 shown in FIG. 1) for controlling the memory so as to store the data after determining the failure of the device in a predetermined address space thereof other than the predetermined address space wherein the data prior to determining the failure of the device is stored, after the device is determined as the failure.

In accordance with the second aspect of the present invention, a method of storing data prior to and after determining a failure of a device, comprises: a memory control step of always enabling a memory which stores data prior to and after determining a failure of a device, to write the data prior to determining the failure of the device, before the device is determined as the failure, and of disabling the memory from writing any data on the basis of the number of the data prior to and after determining the failure, after the device is determined as the failure; a first address storage step of controlling the memory so as to always store the data prior to determining the failure of the device in a predetermined address space thereof, until the device is determined as the failure, and of holding an address pointer indicating the predetermined address space wherein the data prior to determining the failure of the device is stored, when the device is determined as the failure; and a second address storage step for controlling the memory so as to store the data after determining the failure of the device in a predetermined address space thereof other than the predetermined address space wherein the data prior to determining the failure of the device is stored, after the device is determined as the failure.

In accordance with the third aspect of the present invention, a circuit for storing data prior to and after determining a failure of a device, comprises: a memory for storing data prior to and after determining a failure of a device; a counter for enabling the memory to write the data prior to and after determining the failure of the device, for operating a first address pointer circuit before the device is determined as the failure, and for operating a second address pointer circuit after the device is determined as the failure; the first address pointer circuit for outputting an address pointer to the memory so as to store the data prior to determining the failure of the device in a predetermined first address space thereof, when being operated by the counter, and for holding the address pointer when the device is determined as the failure, therein; and the second address pointer circuit for outputting an address pointer to the memory so as to store the data after determining the failure of the device in a predetermined second address space thereof other than the predetermined first address space, when being operated by the counter.

In accordance with the fourth aspect of the present invention, a method of storing data prior to and after determining a failure of a device, comprises: a step of enabling a memory to write data prior to and after determining a failure of a device, therein; a step of storing the data prior to determining the failure of the device in a predetermined first address space of the memory; and a step of storing the data after determining the failure of the device in a predetermined second address space other than the predetermined first address space, of the memory.

According to the circuit and the method of the first and third aspects and the second and fourth aspects of the present invention, respectively, because when the data after determining the failure of the device is stored in the predetermined address space of the memory, other than the predetermined address space wherein the data prior to determining the failure of the device is stored, it is possible that the data both prior to and after determining the failure of the device are stored in the memory.

Further, according to the circuit of the first and third aspects of the present invention, because the circuit comprises two address pointer circuits, and the address pointer circuits generate address pointers in order to store the data prior to and after determining the failure of the device in the memory, respectively, it is possible to provide a circuit having a structure being over the control of the number of data prior to determining the failure of the device. As a result, it is possible to reduce in size of the circuit, to save a space of the circuit, and to require a lower manufacturing cost of the circuit.

Preferably, a circuit for storing data prior to and after determining a failure of a device, according to the circuit of the first aspect of the present invention, further comprises: a read-out control circuit (for example, a read-out control circuit 54 shown in FIG. 1) for enabling the memory to output the data stored therein, for operating the first address pointer circuit from the address pointer held therein, to read out the data corresponding to the number of the data stored prior to determining the failure of the device, of the memory, and for operating the second pointer circuit, to read out the data corresponding to the number of the data stored after determining the failure of the device, of the memory, in order to read out the data stored in the predetermined address spaces of the memory.

Preferably, a method of storing data prior to and after determining a failure of a device, according to the method of the second aspect of the present invention, further comprises: a read-out step of enabling the memory to output the data stored therein, of reading out the data corresponding to the number of the data stored prior to determining the failure of the device, of the predetermined address space indicated by the address pointer held at the first address storage step, and of reading out the data corresponding to the number of the data stored after determining the failure of the device, of the predetermined address space wherein the data is stored at the second address storage step, in order to read out the data stored in the predetermined address spaces of the memory.

Preferably, a circuit for storing data prior to and after determining a failure of a device, according to the circuit of the third aspect of the present invention, further comprises: a read-out control circuit for enabling the memory to output the data stored therein, for operating the first address pointer circuit from the address pointer held therein, to read out the data stored prior to determining the failure of the device, of the predetermined first address space of the memory, and for operating the second pointer circuit, to read the data stored after determining the failure of the device, of the predetermined second address space of the memory.

Preferably, a method of storing data prior to and after determining a failure of a device, according to the method of the fourth aspect of the present invention, further comprises: a step of enabling the memory to output the data stored therein; a step of reading out the data stored prior to determining the failure of the device, of the predetermined first address space of the memory; and a step of reading the data stored after determining the failure of the device, of the predetermined second address space of the memory.

According to the circuit and the method as described above, in order to read out the data stored in the predetermined address spaces of the memory, the read-out control circuit controls the operations of the first and second address circuits, individually, or the data stored prior to and after determining the failure of the device are processed individually. Consequently, it is possible to easily read out the data prior to determining the failure of the device and the data after determining the failure of the device, one by one.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 1 is a block diagram showing a structure of a circuit 1 for storing data prior to and after determining a failure of a device, according to an embodiment of the present invention;

FIGS. 2A and 2B are flow charts showing a process by the circuit 1 shown in FIG. 1; and FIG. 3 is a block diagram showing a structure of the circuit 2 for storing data prior to and after determining a failure of a device, according to an earlier development.

PREFERRED EMBODIMENT OF THE INVENTION

An embodiment of the present invention will be explained with reference to FIGS. 1 to 2B, as follows.

First, the structure of the circuit 1 will be explained with reference to FIG. 1, as follows.

FIG. 1 is a block diagram showing the structure of the circuit 1 for storing data prior to and after determining a failure of a device. In FIG. 1, the circuit 1 for storing data prior to and after determining the failure of the device comprises a device under test 10, a comparing circuit 11, an address generating circuit 12, a data generating circuit 13, a counter 51, an address pointer 1 circuit 52, an address pointer 2 circuit 53, a read-out control circuit 54, a memory circuit 55 and a controller 30.

The device under test 10 is a device as an object under test on the circuit 1 according to an embodiment of the circuit of the present invention. When the address generating circuit 12 generates and outputs an address signal, the address signal is inputted to an Address terminal of the device under test 10. Therefore, the device under test 10 outputs an output signal corresponding to the address signal, from an I/O terminal thereof.

The comparing circuit 11 compares the output signal outputted from the device under test 10 with an expected value signal generated by the data generating circuit 13, to determine a pass or a failure of the device under test 10. Thereby, the comparing circuit 11 outputs a result of determining the pass or the failure to the counter 51.

The output signal outputted from the device under test 10, the expected value signal outputted from the data generating circuit 13, and the address signal outputted from the address generating circuit 12 are inputted as a data signal on the failure of the device to an I/O terminal of the memory circuit 55 through the bus 40.

The counter 51 outputs an effective WE signal to an WE terminal of the memory circuit 55 on the basis of a timing of a reference clock signal inputted thereto, counts up, and outputs the WE effective signal to the address pointer 1 circuit 52 and the address pointer 2 circuit 53.

Further, the counter 51 conforms the result of determining the failure by the comparing circuit 11. When the counter 51 decides that the result outputted from the comparing circuit 11 is the failure, the counter 51 stops the address pointer 1 circuit 52 operating and starts the address pointer 2 circuit 53 operating.

When the address pointer 1 circuit 52 receives the effective WE signal outputted from the counter 51, the address pointer 1 circuit 52 generates an address pointer signal, to output it to the ADD terminal of the memory circuit 55. Further, the address pointer signal is generated so that the address pointed thereby goes round in a predetermined fixed address space of the memory circuit 55.

Further, when the counter 51 stops the address pointer 1 circuit 52 operating, the address pointer 1 circuit 52 holds the address pointer when being stopped, as a stop address pointer.

When the comparing circuit 11 determines the failure of the device under test 10, the counter 51 operates the address pointer 2 circuit 53. Thereby, when the address pointer 2 circuit 53 receives the effective WE signal outputted from the counter 51, the address pointer 2 circuit 53 generates an address pointer signal, to it to the ADD terminal of the memory circuit 55. Further, the address pointer 2 circuit 53 is constructed so as to generated the different address pointer signal from the stop pointer address held in the address pointer 1 circuit 52.

The memory circuit 55 stores the data prior to and after determining the failure of the device, that is the data signal inputted to the I/O terminal, in the address space indicated by the address pointer signal inputted to the ADD terminal, according to the effective WE signal inputted to the WE terminal. To the I/O terminal, the output signal outputted from the device under test 10, the address signal outputted from the address generating circuit 12 and the expected value signal outputted from the data generating circuit 13 are always inputted.

The address pointer signal inputted to the ADD terminal of the memory circuit 55 is a signal outputted from either the address pointer 1 circuit 52 or the address pointer 2 circuit 53. More particular, the address pointer signal outputted from the address pointer 1 circuit 52 is inputted to the ADD terminal prior to determining the failure of the device, while the address pointer signal outputted from the address pointer 2 circuit 53 is inputted to the ADD terminal after determining the failure of the device.

When the effective OE (Output Enable) signal is inputted to the OE terminal, the memory circuit 55 outputs the data prior to and after determining the failure, stored in the predetermined address space thereof, from the I/O terminal.

That is, the operator instructs the read-out control circuit 54 through the controller 30 to read out the data prior to and after determining the failure, stored in the memory circuit 55. Thereby, the read-out control circuit 54 outputs the effective OE signal to the OE terminal of the memory circuit 55 according to the instruction by the operator.

Next, the process by the circuit 1 will be explained, as follows.

The process by the circuit 1 for storing the data prior to and after determining the failure of the device will be explained on the basis of the flow chart shown in FIGS. 2A and 2B.

According to the process as shown in FIG. 2A, the address generating circuit 12 generates the address signal to output it to the Address terminal of the device under test 10. Thereby, the device under test 10 outputs the output signal corresponding to the address signal inputted from the Address terminal, from the I/O terminal thereof. The data generating circuit 13 generates the expected value signal. Thereafter, when the output signal and the expected value signal are inputted to the comparing circuit 11, the comparing circuit 11 compares the output signal with the expected value signal, to determine whether the output signal is the pass or the failure, and to output the result of determining the failure.

The output signal is outputted with the expected value signal and the address signal to the I/O terminal of the memory circuit 55 through the bus 40.

The counter 51 outputs the effective WE signal to the WE terminal of the memory circuit 55, on the basis of the timing of the reference clock signal inputted thereto. At the time, the counter 51 counts up and outputs the effective WE signal to the address pointer 1 circuit 52. Thereby, when the address pointer 1 circuit 52 receives the effective WE signal outputted from the counter 51, the address pointer 1 circuit 52 generates the address pointer signal to output it to the ADD terminal of the memory circuit 55 (Step S1).

The memory circuit 55 stores the data signals inputted to the I/O terminal thereof, as a data prior to determining the failure, in the address space indicated by the address pointer signal outputted from the address pointer 1 circuit 52, according to the timing of the effective WE signal inputted to the WE terminal (Step S2).

The processing as described above is continued until the comparing circuit 11 determines the failure of the output signal. Therefore, the latest data is always stores as the data prior to determining the failure, in the predetermined fixed address space of the memory circuit 55.

When the comparing circuit 11 determines the failure of the output signal (Step S3; YES), to output the result of determining the failure to the counter 51, the counter 51 makes the address pointer 1 circuit 52 hold the address pointer when determining the failure, as a stop address pointer (Step S4), and stops the address pointer 1 circuit 52 operating (Step S5). Accordingly, the data just before determining the failure is stored in the address space indicated by the stop address pointer, of the memory circuit 55.

On the other hand, when the comparing circuit 11 does not determine the failure of the output signal (Step S3; NO), the routine returns to the process of the Step S1 and continues until the comparing circuit 11 determines the failure of the output signal.

The counter 51 operates the address pointer 2 circuit 53 to generate an address pointer signal in order to store the data in the address space of the memory circuit 55, other than the address space indicated by the stop address pointer and used for storing the data prior to determining the failure (Step S6).

When the address pointer 2 circuit 53 generates the address pointer signals corresponding to the number of data stored after determining the failure, the memory circuit 55 stores the data after determining the failure in the address space indicated by the address pointer signals (Step S7), and the counter 51 stops the address pointer 2 circuit 53 operating (Step S8). Thereafter, the counter 51 stops the operating (Step S9), and the routine transfers to the process of the Step S10 in FIG. 2B, as following the arrow 1.

Therefore, the data after determining the failure is stored in the address space other than the address space in which the data prior to determining the failure is stored.

Accordingly, it is possible that the data prior to and after determining the failure, stored in the address spaces of the memory circuit 55 are read out when the operator instructs the read-out control circuit 54 through the controller 30.

According to the process as shown in FIG. 2B, when the read-out control circuit 54 is instructed to read out the data stored in the memory circuit 55 through the controller 30 (Step S10; YES), the read-out control circuit 54 outputs the effective OE signal to the OE terminal of the memory circuit 55 (Step 11) and operates the address pointer 1 circuit 52 from the stop address pointer held therein.

On the other hand, when the read-out control circuit 54 is not instructed to read out the data stored in the memory circuit 55 (Step S10; NO), the routine continues until the read-out control circuit 54 is instructed to read out the data through the controller 30.

When the memory circuit 55 receives the effective OE signal from the OE terminal thereof, the memory circuit 55 reads out the data corresponding to the number of data stored prior to determining the failure, of the address space indicated by the stop address pointer outputted from the address pointer 1 circuit 52, and outputs the data read out, from the I/O terminal thereof (Step S12).

When the memory circuit 55 reads out the data prior to determining the failure, the read-out control circuit 54 operates the address pointer 2 circuit 53 to generate the address pointer. Herein, the address pointer 2 circuit 53 generates the address pointer so as to access from a start address pointer other than the stop address pointer used by the address pointer 1 circuit 52 to an address pointer corresponding to the number of data stored after determining the failure, in order.

Thereafter, the memory circuit 55 reads out the data corresponding to the number of data stored after determining the failure, of the address space thereof indicated by the address pointer inputted, and outputs the data read out, from the I/O terminal thereof (Step S13).

As described above, the predetermined fixed address space is set as an exclusive space for storing the data prior to determining the failure of the device, in the memory circuit 55, the data prior to determining the failure of the device is always stored in the predetermined fixed address space, the operation of storing the data is stopped when the failure of the device is determined, and the data is held in the predetermined fixed address space. Thereafter, the data after determining the failure of the device is stored in the address space other than the predetermined fixed address space. Accordingly, it is possible that the circuit stores the data prior to determining the failure of the device in the memory.

Further, the circuit comprises two address pointer circuits, and the address pointer circuits generate the address pointers so that the memory stores the data prior to and after determining the failure of the device, individually. Accordingly, it becomes unnecessary that the circuit uses the shift circuit composed of the shift registers. As a result, it is possible that the circuit had a structure being over the control of the number of data prior to determining the failure of the device.

According to the present invention, some effects will be explained, as follows.

Because when the data after determining the failure of the device is stored in the predetermined address space of the memory, other than the predetermined address space wherein the data prior to determining the failure of the device is stored, it is possible that the data both prior to and after determining the failure of the device are stored in the memory.

Further, because the circuit comprises two address pointer circuits, and the address pointer circuits generate address pointers in order to store the data prior to and after determining the failure of the device in the memory, respectively, it is possible to provide a circuit having a structure being over the control of a number of data prior to determining the failure of the device. As a result, it is possible to reduce in size of the circuit, to save a space of the circuit, and to require a lower manufacturing cost of the circuit.

Furthermore, in order to read out the data stored in the predetermined address spaces of the memory, the readout control circuit controls the operations of the first and second address circuits, individually, or the data stored prior to and after determining the failure of the device are processed individually. Consequently, it is possible to easily read out the data prior to determining the failure and the data after determining the failure, one by one.

The entire disclosure of Japanese Patent Application No. Tokugan 2000-89067 filed on Mar. 28, 2000 including specification, claims, drawings and summary are incorporated herein by reference in its entirety.

What is claimed is:

1. A circuit for storing data prior to and after determining a failure of a device, comprising:
    a counter for always enabling a memory which stores data prior to and after determining a failure of a device, to write the data prior to determining the failure of the device, before the device is determined as the failure, and for disabling the memory from writing any data on the basis of the number of the data prior to and after determining the failure, after the device is determined as the failure;
    a first address pointer circuit for controlling the memory so as to always store the data prior to determining the failure of the device in a predetermined address space thereof, until the device is determined as the failure, and for holding an address pointer indicating the predetermined address space wherein the data prior to determining the failure of the device is stored, when the device is determined as the failure; and
    a second address pointer circuit for controlling the memory so as to store the data after determining the failure of the device in a predetermined address space thereof other than the predetermined address space wherein the data prior to determining the failure of the device is stored, after the device is determined as the failure.

2. A circuit for storing data prior to and after determining a failure of a device, according to claim 1, further comprising:
    a read-out control circuit for enabling the memory to output the data stored therein, for operating the first address pointer circuit from the address pointer held therein, to read out the data corresponding to the number of the data stored prior to determining the failure of the device, of the memory, and for operating the second pointer circuit, to read out the data corresponding to the number of the data stored after determining the failure of the device, of the memory, in order to read out the data stored in the predetermined address spaces of the memory.

3. A method of storing data prior to and after determining a failure of a device, comprising:
    a memory control step of always enabling a memory which stores data prior to and after determining a failure of a device, to write the data prior to determining the failure of the device, before the device is determined as the failure, and of disabling the memory from writing any data on the basis of the number of the data prior to and after determining the failure, after the device is determined as the failure;
    a first address storage step of controlling the memory so as to always store the data prior to determining the failure of the device in a predetermined address space thereof, until the device is determined as the failure, and of holding an address pointer indicating the predetermined address space wherein the data prior to determining the failure of the device is stored, when the device is determined as the failure; and
    a second address storage step for controlling the memory so as to store the data after determining the failure of the device in a predetermined address space thereof other than the predetermined address space wherein the data prior to determining the failure of the device is stored, after the device is determined as the failure.

4. A method of storing data prior to and after determining a failure of a device, according to claim 3, further comprising:
    a read-out step of enabling the memory to output the data stored therein, of reading out the data corresponding to the number of the data stored prior to determining the failure of the device, of the predetermined address space indicated by the address pointer held at the first address storage step, and of reading out the data corresponding to the number of the data stored after determining the failure of the device, of the predetermined address space wherein the data is stored at the second address storage step, in order to read out the data stored in the predetermined address spaces of the memory.

5. A circuit for storing data prior to and after determining a failure of a device, comprising:
    a memory for storing data prior to and after determining a failure of a device;
    a counter for enabling the memory to write the data prior to and after determining the failure of the device, for operating a first address pointer circuit before the device is determined as the failure, and for operating a second address pointer circuit after the device is determined as the failure;
    the first address pointer circuit for outputting an address pointer to the memory so as to store the data prior to determining the failure of the device in a predetermined first address space thereof, when being operated by the counter, and for holding the address pointer when the device is determined as the failure, therein; and
    the second address pointer circuit for outputting an address pointer to the memory so as to store the data after determining the failure of the device in a predetermined second address space thereof other than the predetermined first address space, when being operated by the counter.

6. A circuit for storing data prior to and after determining a failure of a device, according to claim 5, further comprising:
    a read-out control circuit for enabling the memory to output the data stored therein, for operating the first address pointer circuit from the address pointer held therein, to read out the data stored prior to determining the failure of the device, of the predetermined first address space of the memory, and for operating the second pointer circuit, to read the data stored after determining the failure of the device, of the predetermined second address space of the memory.

7. A method of storing data prior to and after determining a failure of a device, comprising:
    a step of enabling a memory to write data prior to and after determining a failure of a device, therein;
    a step of storing the data prior to determining the failure of the device in a predetermined first address space of the memory; and a step of storing the data after determining the failure of the device in a predetermined second address space other than the predetermined first address space, of the memory.

8. A method of storing data prior to and after determining a failure of a device, according to claim 7, further comprising:

a step of enabling the memory to output the data stored therein;

a step of reading the data stored prior to determining the failure of the device, of the predetermined first address space of memory; and a step of reading the data stored after determining the failure of the device, of the predetermined second address space of the memory.

* * * * *